United States Patent [19]

Allen

[11] Patent Number: 4,464,089
[45] Date of Patent: Aug. 7, 1984

[54] LOAD LASHING TUBULAR ANCHOR FOR SHORING BEAMS

[76] Inventor: Daniel G. Allen, 28340 E. Abernathy La., Welches, Oreg. 97067

[21] Appl. No.: 408,618

[22] Filed: Aug. 16, 1982

[51] Int. Cl.³ .......................... B60P 7/10; B60P 7/14; B60P 45/00

[52] U.S. Cl. .................................. 410/97; 410/85; 410/96; 410/101; 410/143

[58] Field of Search ................. 410/10, 11, 12, 85, 410/96, 97, 98, 99, 100, 101, 104, 105, 143

[56] References Cited

U.S. PATENT DOCUMENTS

| | | | |
|---|---|---|---|
| 1,181,377 | 5/1916 | Dowell | 410/97 |
| 2,227,870 | 1/1941 | Thomas | 410/10 |
| 2,605,064 | 7/1952 | Davis | 410/104 |
| 2,638,063 | 5/1953 | Clark | 410/101 |
| 3,157,133 | 11/1964 | Wojcikowski | 410/12 |
| 3,465,691 | 9/1969 | Simmons | 410/12 |
| 3,478,995 | 11/1969 | Lautzenhiser et al. | 410/104 |
| 3,677,562 | 7/1972 | Bronstein | 410/97 |
| 3,831,976 | 8/1974 | Iden, Sr. | 410/104 |
| 3,850,113 | 11/1974 | Sichak | 410/104 |
| 3,972,500 | 8/1976 | Johnson et al. | 410/85 |
| 4,010,694 | 3/1977 | Mooney et al. | 410/104 |
| 4,049,229 | 9/1977 | Peisner | 410/11 |
| 4,256,424 | 3/1981 | Knox et al. | 410/105 |
| 4,369,009 | 1/1983 | Fulford | 410/100 |

*Primary Examiner*—Howard Beltran
*Attorney, Agent, or Firm*—Eugene M. Eckelman

[57] ABSTRACT

An open ended tubular anchor member is arranged to be fitted on a conventional shoring beam and has a strap confining opening extending therethrough. A flexible strap passes through the opening and is arranged to engage a load and firmly bind the load relative to the shoring beam. At least two of the strap confining openings may be provided to facilitate the extension of straps in different directions.

3 Claims, 4 Drawing Figures

U.S. Patent      Aug. 7, 1984      4,464,089
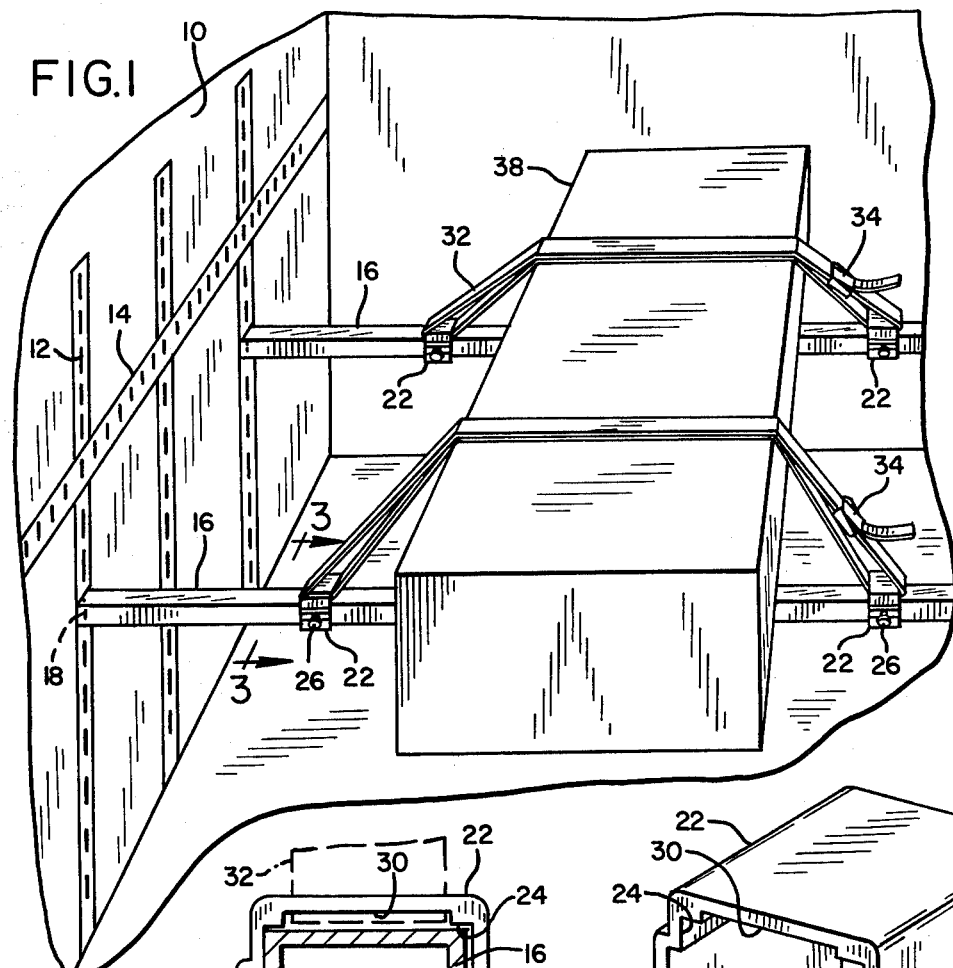
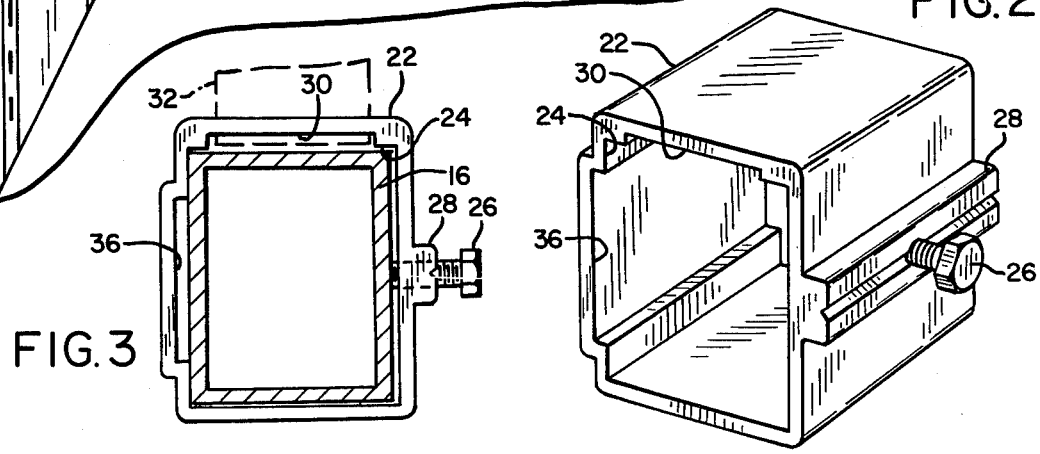
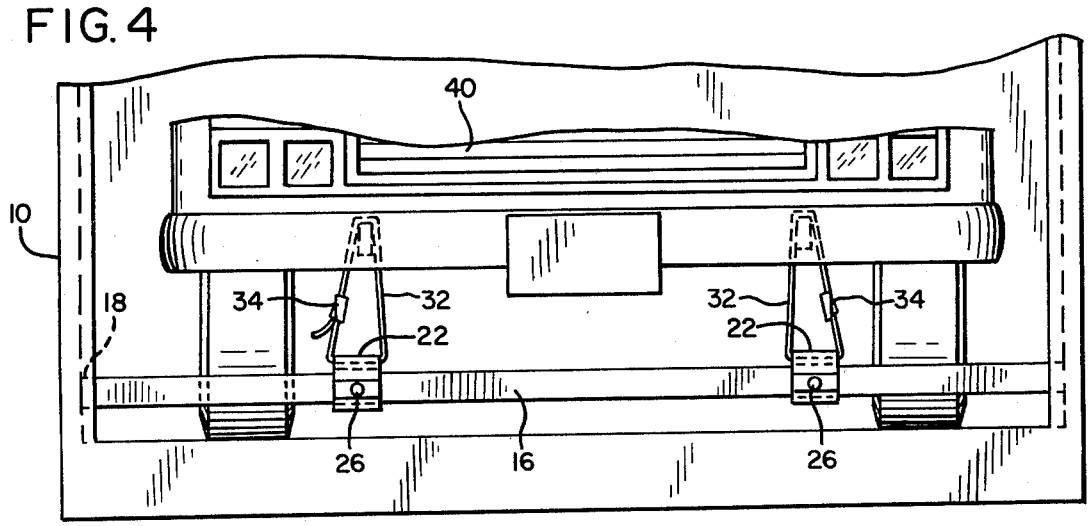

LOAD LASHING TUBULAR ANCHOR FOR SHORING BEAMS

BACKGROUND OF THE INVENTION

This invention relates to new and useful improvements in cargo restraining systems.

Cargo transporting vehicles have utilized various devices for packing and holding cargo, the two primary concerns being to most efficiently utilize the cargo space and also to tie or brace the cargo to prevent damage in transit. Transporting vehicles are now utilizing vertical and horizontal tracks installed on the inner surface of the load carrying area which support cross decking members referred to in the trade as shoring beams. These beams are arranged to construct temporary auxiliary decks to increase the load carrying capacity. Various tying and bracing structures have heretofore been used in the vehicles but such structures are bulky, expensive, and time consuming to use.

SUMMARY OF THE INVENTION

According to the present invention and forming a primary objective thereof, an improved cargo restraining system is employed which is arranged to be associated with the conventional cross shoring beams and which uses equipment that is light in weight, easy to handle, inexpensive to manufacuture, and easy to apply.

A more particular object of the invention is to provide a cargo restraining system utilizing an anchor member arranged to be mounted on the usual shoring beams and associated with one or more length adjustable straps for engaging a load and firmly binding the load relative to the shoring beam.

Still another object is to provide a cargo restraining system of the type described wherein an anchor member is tubular in construction and has inner openings for load engaging straps whereby to engage a load and firmly bind the load relative to the shoring beam. Such may comprise either securing the load in contact with the beam or holding the load down against the floor out of contact with the beam. Another object of the invention is to provide a tubular anchor member employing at least two strap confining openings therein disposed at approximately 90 degrees apart to facilitate extension of strap means from said openings in different directions.

In carrying out the objectives of the invention, there is employed an open ended tubular anchor member arranged to be fitted on a conventional cross shoring beam. The tubular anchor member has a strap confining opening extending therethrough, and a flexible strap is arranged to extend through said opening and engage a load for firmly holding the load fixed relative to the shoring beam. In a preferred construction, the strap confining opening comprises an extension of the tubular opening in the anchor member and the opening allows slidable movement of the strap means therein. Furthermore, the anchor member may include two of said strap confining openings disposed at approximately 90 degrees apart to facilitate extension of the strap in different directions. The flexible strap is arranged to secure a load either in contact with the shoring beam or down against the floor out of contact with the beam.

BRIEF DESCRIPTION OF THE DRAWINGS

FIG. 1 is a fragmentary perspective view of an inner wall portion of the cargo area of a transporting vehicle and illustrating application of the present invention thereto;

FIG. 2 is an enlarged perspective view of a tubular anchor member forming a part of the invention;

FIG. 3 is a cross sectional view of the tubular anchor member engaged with a shoring beam, this view being taken on the line 3—3 of FIG. 1; and FIG. 4 is an elevational view showing another application of the present system.

DETAILED DESCRIPTION OF A PREFERRED EMBODIMENT

With particular reference to the drawings, the numeral 10 in FIG. 1 designates the inner surface of the cargo area of a load transporting vehicle, such as a truck, a railroad car, etc. As stated hereinbefore, cargo areas now in use employ vertical tracks 12 and horizontal tracks 14 which removably support cross shoring beams 16 by means of end tongues 18, FIG. 4, on the beams removably engageable in slots in the tracks. The shoring beams provide an auxiliary deck for increasing the load carrying capacity of the cargo area. The cargo placed in such area is generally tied down or braced against the walls of the cargo area.

According to the present invention, anchor members 22 are provided that are arranged for mounting on the shoring beams for anchoring cargo in an efficient and secure manner. With particular reference to FIGS. 2 and 3, such an anchor member comprises an open ended tubular structure with its inner opening 24 therethrough of a selected size and shape to fit slidably on the shoring beams 16. Generally, the shoring beams 16 are rectangular in cross section, and accordingly the openings 24 are similarly shaped to provide a slidable fit. A set screw 26 is threaded through a reinforced wall portion 28 of the anchor member and is arranged to engage a surface of the shoring beam for holding the anchor member in a fixed position.

The opening 24 through the anchor member has a recess or extension 30 which also extends from end to end of the anchor member. This recess forms a longitudinal area for receiving a hold-down strap assembly 32 comprising a suitable length of strong strapping, such as nylon, having length connecting buckle means 34 therein. Recess 30 is of a depth to provide free slidable movement of the strap therethrough.

In a preferred construction, anchor member 22 has a second recess 36 spaced 90 degrees around from the recess 30, namely, on an adjoining side of the anchor member. Recess 36 is also arranged to slidably receive a strap 32 wherein a strap can extend in one direction from one side or individual straps can extend in different directions from the two sides.

FIG. 1 illustrates one system employing the invention. In such system, shoring beams 16 are mounted in the cargo area to form an auxiliary deck for supporting cargo articles 38. In this arrangement, the articles 38 can be tied down by utilizing a pair of the anchor members 22 and one or more straps 32. In such arrangement, an anchor member is placed on each side of the article 38 and the strap 32 passed through both of their openings 30 and tightened by means of the buckle 34. The anchor members may be secured in place by the set screws 26 if desired. Such an arrangement securely anchors the cargo articles to the decking and such is readily accomplished in a minimum of time. Release of the straps is also accomplished in a minimum of time.

With reference to FIG. 4, a restraining system is shown wherein a shoring beam 16 serves as a holddown for a cargo article 40, such as an automobile, supported on the floor of the vehicle. In such arrangement, the shoring beam 16 is mounted in a lower position in the cargo area and one or more anchor members 22 thereon has its strap 32 engaged with a portion of the cargo article, such as a bumper frame or the like. In this arrangement, the upward restraint of the shoring beam 16 in the side tracks holds an article firmly down on the floor of the cargo area.

The present system thus is conveniently operative with cross shoring beams to anchor cargo articles in place. The anchor members and straps in association with the shoring beams can anchor substantially any type or shape of cargo article. Such is accomplished by the capability of the anchor members being laterally adjusted and the straps being readily positioned and tightened.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A cargo restraining system comprising
   (a) at least one rectangular shoring beam arranged to be secured to side walls of a transporting vehicle,
   (b) at least one tubular anchor member having a rectangular opening therethrough for slidably mounting said anchor member on said shoring beam,
   (c) a strap confining opening forming a groove extending through said anchor member in parallel relation to said rectangular opening,
   (d) a flexible strap passing through said strap confining opening arranged to engage a load and firmly bind the load relative to the shoring beam,
   (e) and set screw means in said anchor member arranged to secure said anchor member in a selected fixed position on said shoring beam.

2. The cargo restraining system of claim 1 wherein said strap confining opening comprises an extension of the rectangular opening of said anchor member, said extension having a dimension which allows slidable movement of said strap therein.

3. The cargo restraining system of claim 2 including at least two of said strap confining openings, said two strap confining openings being disposed at approximately a right angle apart facilitating extension of straps from said strap confining openings in different directions.

* * * * *